United States Patent [19]

Wallace

[11] Patent Number: 4,618,755
[45] Date of Patent: Oct. 21, 1986

[54] UNIVERSAL MATRIX SWITCHING DEVICE

[75] Inventor: John E. Wallace, Athens, Ala.

[73] Assignee: The Boeing Company, Seattle, Wash.

[21] Appl. No.: 737,941

[22] Filed: May 28, 1985

[51] Int. Cl.[4] .................... H01H 63/00; H01H 67/00; H02B 1/02
[52] U.S. Cl. ................................. 200/175; 335/108; 335/113; 362/352
[58] Field of Search ............................... 200/175–180, 200/16 B, 16 E; 361/352, 416; 335/108, 111–113, 120

[56] References Cited

U.S. PATENT DOCUMENTS 2,664,468 12/1953 Montchausse ................ 335/113 X
3,151,923 10/1964 Bell et al. ..................... 361/352 X
3,225,322 12/1965 Reel ............................... 361/352 X
3,349,361 10/1967 Curtelli .......................... 361/352 X
4,421,965 12/1983 Gentric et al. ..................... 200/175

Primary Examiner—J. R. Scott
Attorney, Agent, or Firm—Edwin H. Crabtree

[57] ABSTRACT

A universal matrix switching device is used with an automatic test system under computer control for interfacing with a unit under test to test system instrumentation. The switch has impedance matching with isolation between signal paths for high frequency transmission quality. The device uses movable switch actuators serving as multiple cross-point switches embedded in a matrix board with conductors.

9 Claims, 6 Drawing Figures

U.S. Patent   Oct. 21, 1986   Sheet 2 of 2   4,618,755
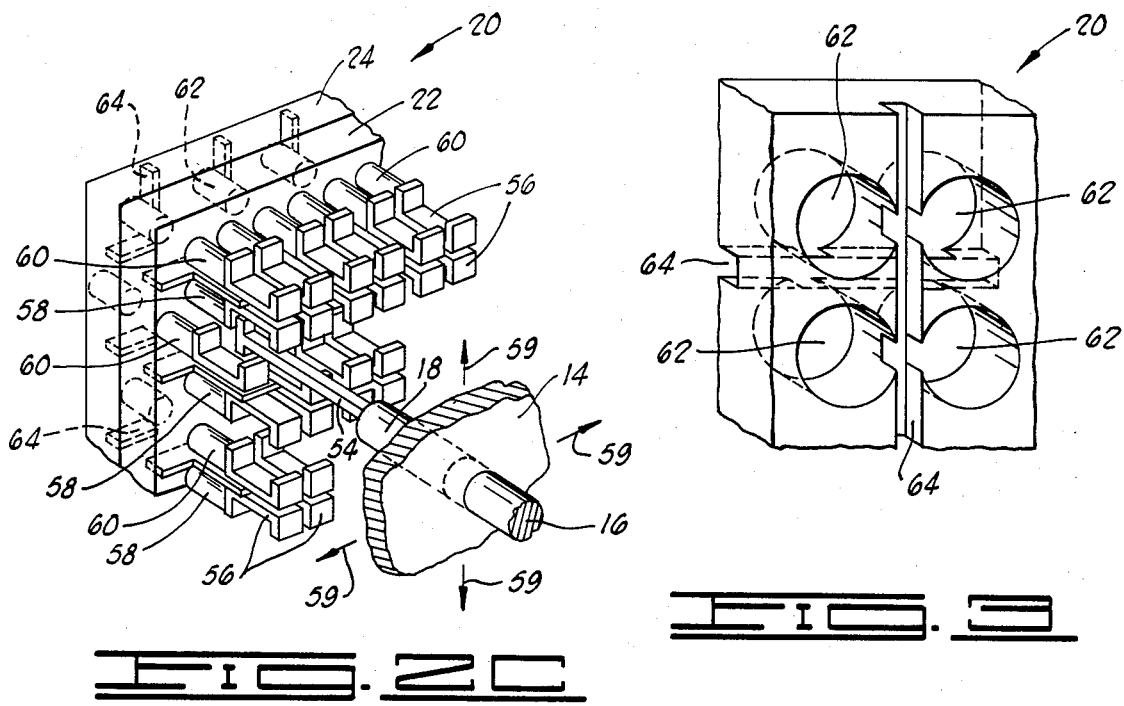
FIG. 2C
FIG. 3
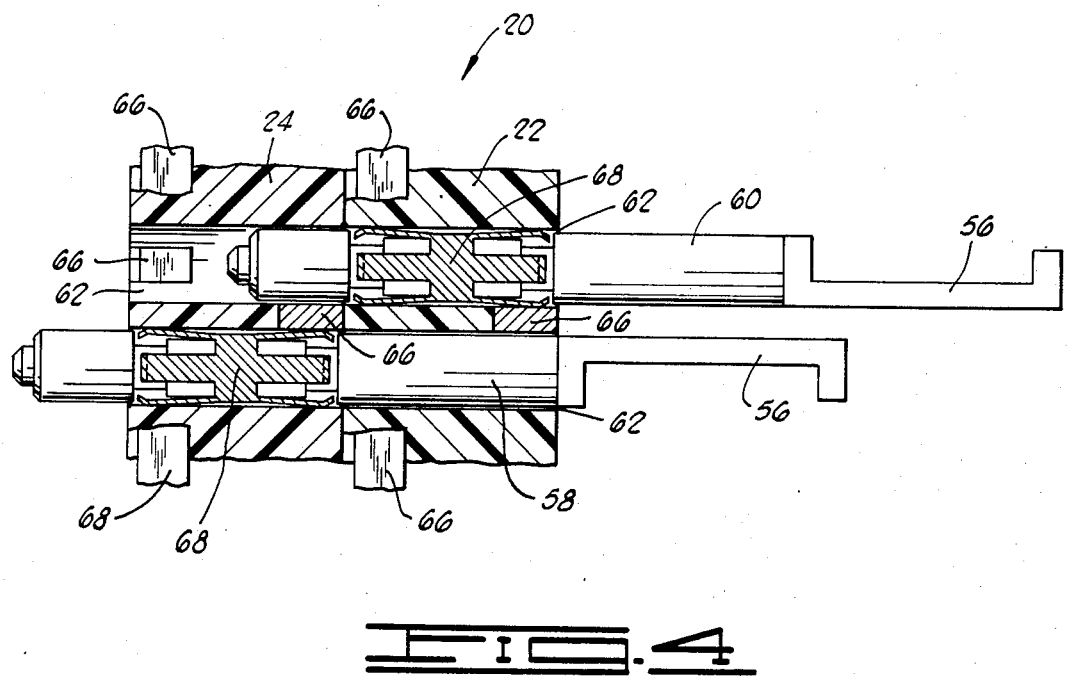
FIG. 4

UNIVERSAL MATRIX SWITCHING DEVICE

BACKGROUND OF THE INVENTION

This invention relates to a matrix switching device and more particularly, but not by way of limitation, to a universal matrix switching device used with an automatic test system under computer control for interfacing with a unit to be tested.

Heretofore, matrix units exhibited poor transmission characteristics at high frequency. Above one metahertz serious loss would occur from radiation or from signal reflections due to impedance mismatches with 50 OHM coaxial interfaces commonly found in test systems. To have good high frequency transmission qualities the matrix must provide for impedance matching and for isolation between signal paths.

Prior matrix switching devices have had uniform spacing of conductors in their design. As as result a signal and its return have differing amounts of interferences induced in them from adjacent signal paths. The uniform layout of signal lines results in poor common mode rejection quality. This problem is intensified as the frequency of operation is increased.

Also, prior matrix switching devices have relied on a single relocatable actuator to close cross-point switches. In an automatic test application this design is unsuitable because the single actuator will have to travel excessively long distances to provide the sequential switching at random locations. Consequentially, both excessive wear and time delays will be incurred in its operation. Additionally, a single actuator design concentrates all switch operations on the one actuator causing a reduction in the unit's operating life.

Prior matrix switching devices have not had the capability to open individual switches in the matrix. A reset of all switches is necessary to reset one switch. This is a severe limitation in automatic test applications.

Various switching devices are described in the following U.S. Patents: U.S. Pat. No. 3,191,040 to Critchlow, U.S Pat. No. 3,219,927 to Topp Jr., et al, U.S. Pat. No. 3,631,374 to Cartelli, U.S. Pat. No. 3,796,848 to Southworth, Jr., U.S. Pat. No. 3,905,020 to Knox, U.S. Pat. No. 4,215,420 to Kassakian, U.S. Pat. No. 4,326,191 to Schlecht et al. None of these prior art patents specifically describe and point out the unique features and combination of structure of the subject universal matrix switching device as described herein.

SUMMARY OF THE INVENTION

The subject matrix switching device provides for high quality matrix switching between two sets of electrical signal pairs by providing for impedance matching and for isolation between signal paths.

Further, the invention provides for increased life, improved current, voltage and power handling characteristics and eliminates the above-mentioned problems characteristic of prior switching matrices used in test systems.

The matrix switching device provides bi-direction solenoids with latches mounted on a plate fixed to a movable position table with the latches engaging conductor pins in a matrix board for improved switching arrangements and increased wear life.

The universal matrix switching device includes a position table with movable plate having a plurality of bi-directional solenoids with latches for engaging conductor pins received in a matrix board. The matrix board is made up of a status board and main board having a plurality of apertures therethrough for receiving the conductor pins. The boards have slots cut on opposite sides of each of the boards and orthogonally oriented. The slots form a grid pattern with the slots and holes slightly over-lapping. Transmission conductor strips are received in the slot for conducting a signal from input to output when the pins close the switch between the opposite conductor strips.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 2C illustrates an isometric view of the movable plate and the matrix board with a plurality of conductor pins.

FIG. 3 illustrates a portion of the matrix board with four pin conductor apertures with slots for receiving transmissions strips.

FIG. 4 illustrates a side cross-sectional view of the matrix board with a first and second pin in opposite states of operation.

DETAILED DESCRIPTION OF THE DRAWINGS

Figure 1:
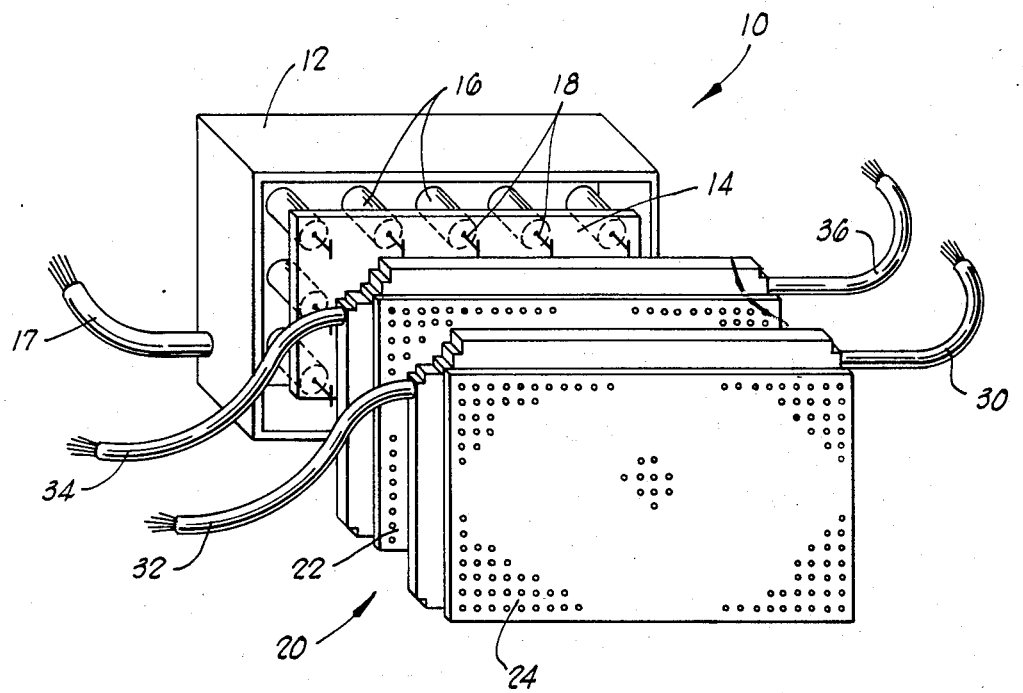
FIG. 1 illustrates the major components of the universal matrix switching device in an exploded view.

In FIG. 1 the universal matrix switching device is designated by general reference numeral 10 and includes a position table 12 with a movable plate 14 having a plurality of actuators or bi-directional solenoids 16 mounted thereon and including outwardly extending "T" shaped latches 18. Electrical lead 17 connects the position table 12 and solenoids 16 to electronic control circuits.

The universal matrix switching device 10 further includes a matrix board having a general reference numeral 20 and including a status board 22 and a main board 24. The main board 24 is electrically connected to an electrical lead 30 which is connected to a conductor set (not shown) and electrical lead 32 which is connected to a conductor set (not shown). The conductor sets represent the two sets of electrical signal pairs which will be connected by the matrix switch. The status board 22 is electrically connected to electronic circuits (not shown) designed to monitor switch status by electrical leads 34 and 36.

Figures 2A, 2B:
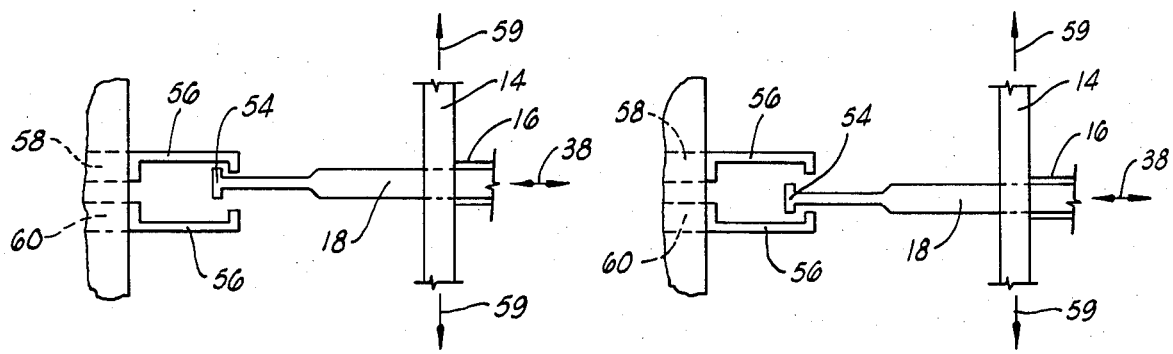
FIGS. 2A and 2B illustrate the movable plate with latch for engaging pins mounted on the matrix board.

In FIG. 2A a latch 18 which is connected to a solenoid 16 is movable from left to right as indicated by arrow 38. The latch 18 includes a "T" shaped end portion 54 for engaging a "C" shaped end portion 56 of a first movable conductor pin 58. The "T" shaped latch 18, by movement to the left, urges the first pin 58 inwardly in matrix board to a closed position. By the movement of the solenoid 18 to the right, the "T" shaped end portion 54 of the latch 18 engages the first pin 58 and moves it also to the right into an opened position. Through the use of the movable plate 14 as indicated by arrows 59, the latch 18 can be moved downwardly for engaging a second conductor pin 60 for opening and closing this pin in the matrix board. The bi-directional solenoid 16 with the latch 18 are designed to interface with the various pins residing in the matrix board 20. The solenoid 16 is spring loaded to return to a center position. When in the center position, the solenoid 16 and latch 18 may move between rows of pins in a plane parallel to the matrix board 20 without contacting the pin. As mentioned above, the pins 58 and 60 may be moved into an opened or closed position with the solenoid 16 positioning the latch 18 under a desired pin and moving the pin into a desired position when the solenoid is activated.

The multiplicity of the solenoids 16 on the movable plate 14 serves a dual role. First it reduces the distance the position table 12 must move to open or close the pins in the matrix board 20. This improves the response time to a random switch operation. The second advantage is to extend the operating life of the solenoids and the position table. The use of the multiple solenoids provides significant improvements over prior art matrix switching units using a single movable actuator.

The position table 12 is an electromechanical unit whose function is to move the switch actuators or solenoids 16 in a plane parallel to the matrix board 20 under computer control.

In FIG. 2C a perspective view of one of the solenoids 16 with "T" shaped latch 18 can be seen positioned adjacent a first conductor pin 58 and a second conductor pin 60. Also seen in this view are a plurality of pins 58 and 60 received in the status board 22 and main board 24 making up the matrix board 20.

Referring now to FIG. 3, the construction applicable to either the status board 22 or main board 24 is shown. The matrix boards 22 or 24 may be constructed of dielectric material with a plurality of apertures 62 with slots 64 machined therein and orthogonally oriented on opposite sides of the boards. When viewed from a direction normal to each of the boards, the flat surface with slots 54 form a grid pattern. For example, the slots on one side of the board are horizontal while the slots on the opposite side are vertical. At each grid junction, a set of four of the apertures 62 are drilled therein so that the slots 64 and apertures 62 are slightly overlapping.

Installed inside each of the slots 64 are transmission strips 66 for conducting the signal from input to output. Each of the strips 66 as shown in FIG. 4 include a pair of flat parallel conductors separated by a dielectric for demonstrating a desired impedance. The width for each conductor, the separation between the conductors and the dielectric constant of the dielectric material therebetween and surrounding the conductors determine the characteristic impedance of the transmission strip. In practice to achieve a characteristic impedance of 50 ohms, the flat conductors are relatively close together compared to separation between conductor pairs. Because of the relatively close conductor spacing (i.e. 0.02 inch), signals being transmitted on the conductor pair are more immune to external interference than signals being transmitted on conductor pairs with wider spaces. The converse is also true. Closely spaced conductors will lose less of their energy to adjacent circuits than conductor pairs more spacially dispersed. The design of the transmission strips provides the additional benefits of conserving matrix board area which results in a high switch density. The transmission strips 66 are installed in the slots 64 in the status board 22 and the main board 24 so the flat side of the transmission strips 66 are parallel to the apertures 62 and overlapping the apertures 62 slightly.

In FIG. 4 a cross-sectional view of the main board 24 and status board 22 is shown with the first pin 58 and second pin 60 in opposite states of operation. The pins 58 and 60 in contact function to electrically connect the orthogonal transmission strips 66 on the opposite sides of each of the boards. An electrical contact 68 is barrel-shaped with the ends slitted and formed into spring contacts. The contact 68 is mounted on the pin which is a shaft made of a hard dielectric material. The end of each pin is formed to make the "C" shaped end portion 56, that is designed to allow the "T" shaped latch 54 on the end of the solenoid 16, to either push or pull the pin into an opened or closed position. The length of the contact 68 is approximately equal to the distance separating the transmission strips 66 on the opposite sides of either the main or status board 22 and 24. The contact 68 rides in a recess on the pin and the ends of the contact are shaped to slide over the portion of the strip 66 lapping into the aperture 62. The pressure of the spring contact 68 prevents the pin from moving in the aperture 62 without actuation from the solenoid 16.

Changes may be made in the construction and arrangment of the parts or elements of the embodiments as described herein without departing from the spirit or scope of the invention defined in the following claims.

What is claimed is:

1. A universal matrix switching device connected to an electronic controller for matrix switching two sets of electric signal pairs, the device comprising:

a position table with plate having a plurality of actuators mounted thereon, the actuators under electronic control;

a matrix board having a plurality of apertures therethrough and slots cut on both sides of the board and orthogonally oriented with the slots forming a grid pattern, the slots and apertures slightly overlapping;

transmission conductor strips received in the slots for conducting a signal input to output; and a plurality of movable pins received in the apertures in the matrix board and having electrical contacts therearound, one end of the pins extending outwardly from the matrix board for engagement with the actuators, the actuators when actuated engaging the pins for moving the pins in the matrix board and providing contact between the transmission conductor strips in the slots on both sides of the matrix board.

2. The device as described in claim 1 wherein the actuators are bi-directional solenoids with latches extending outwardly therefrom for engaging the ends of the pins and moving the pins from an opened to a closed position in the matrix board and returning the pins to an opened position.

3. The device as described in claim 1 wherein the matrix board is divided into status board and a main board disposed adjacent to each other, each of the boards having a plurality of apertures therethrough and indexed with each other, slots cut on both sides of each board and orthogonally oriented with the slots forming a grid pattern, the slots and apertures slightly over-lapping, the slots receiving the transmission conductor strips with the apertures in each of the boards receiving the pins therethrough.

4. A universal matrix switching device connected to an electronic controller for matrix switching two sets of electric signal pairs, the device comprising:

a position table with plate, the plate having a plurality of bi-directional solenoids mounted thereon, the solenoids having latches extending outwardly therefrom, the solenoids under electronics control;

a matrix board made up of a main board and status board disposed adjacent each other, each of the boards having a plurality of apertures therethrough and indexed with each other and slots cut on both sides of each board and orthogonally oriented with the slots forming a grid pattern, the slots and apertures slightly over-lapping;

transmission conductor strips received in the slots for conducting a signal input to output; and a plurality of movable pins received in the apertures in the main board and status board of the matrix board, the pins having electrical contacts therearound, one end of the pins extending outwardly from the matrix board toward the latches of the bi-directional solenoids, when actuated the latches engaging the ends of the pins for moving the pins in the matrix board and providing contact between the transmission strips in the slots on both sides of the boards.

5. The device as described in claim 4 wherein the position table is movable in a plane parallel to the matrix board, the table moving the plate with a bi-directional solenoid with latch engaging one contact pin, in a first position and with parallel movement engaging a second pin in a second position.

6. The device as described in claim 5 wherein one end of the contact pins are "C" shaped, with the end of the latch "T" shaped, one side of the "T" shaped latch engaging the "C" shaped contact pin for moving it into either an opened or closed position.

7. The device as described in claim 4 wherein the pin is in an opened position when the electrical contact of the pin is received in an aperture in the status board and engaging the oppositely disposed conductor strips in the status board, when the solenoid with latch moves the pin to a closed position, the pin is moved into the main board with the electrical contact received in an adjacent aperture in the main board and the electrical contact of the pin engaging the oppositely disposed conductor strips in the main board.

8. A universal matrix switching device connected to an electronic controller for matrix switching two sets of electric signal pairs, the device comprising:

a position table with plate, the plate having a plurality of bi-directional solenoids mounted thereon, the solenoids having latches extending outwardly therefrom with the end of the latches "T" shaped, the solenoids under electronic control;

a matrix board made up of a main board and a status board disposed adjacent each other, each of the boards having a plurality of apertures therethrough and indexed with each other and slots cut on both sides of each board and orthogonally oriented with the slots forming a grid pattern, the slots and apertures slightly overlapping;

transmission conductor strips received in the slots for conducting a signal input to output; and a plurality of movable pins received in the apertures in the main board and status board of the matrix board, the pins having electrical contacts therearound, one end of the pins extending outwardly from the matrix board toward the latches of the bi-directional solenoids, the "C" shaped ends of the contact pins with the "T" shaped latches engaging the "C" shaped contact pins ends for moving the pins in the matrix board and providing contact between the transmission strips in the slots on both sides of the main board and status board.

9. The device as described in claim 8 wherein the position table is movable in a plane parallel to the matrix board, the table moving the plate with the bi-directional solenoid with "T" shaped latch engaging the "C" shaped end of a first contact pin and with parallel movement of the position table, the same "T" shaped latch engaging the "C" shaped end of a second pin.

* * * * *